US012334648B2

(12) United States Patent
Sokolov et al.

(10) Patent No.: US 12,334,648 B2
(45) Date of Patent: Jun. 17, 2025

(54) DUAL MODE ANTENNA ARRANGEMENT

(71) Applicant: Huawei Technologies Co., Ltd., Shenzhen (CN)

(72) Inventors: Konstantin Sokolov, Helsinki (FI); Hanyang Wang, Reading (GB); Zlatoljub Milosavljevic, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 17/916,515

(22) PCT Filed: Apr. 6, 2020

(86) PCT No.: PCT/EP2020/059769
§ 371 (c)(1),
(2) Date: Sep. 30, 2022

(87) PCT Pub. No.: WO2021/204349
PCT Pub. Date: Oct. 14, 2021

(65) Prior Publication Data
US 2023/0187827 A1 Jun. 15, 2023

(51) Int. Cl.
*H01Q 5/35* (2015.01)
*H01Q 1/24* (2006.01)
(Continued)

(52) U.S. Cl.
CPC ............... *H01Q 5/35* (2015.01); *H01Q 1/243* (2013.01); *H01Q 5/371* (2015.01); *H01Q 5/40* (2015.01); *H01Q 9/285* (2013.01); *H01Q 9/40* (2013.01)

(58) Field of Classification Search
CPC .......... H01Q 5/35; H01Q 1/243; H01Q 5/371; H01Q 5/40; H01Q 9/285; H01Q 9/40
See application file for complete search history.

(56) References Cited

U.S. PATENT DOCUMENTS 7,403,161 B2 7/2008 DiNallo et al.
7,683,839 B2 * 3/2010 Ollikainen ........... H01Q 9/0421 343/702

(Continued)

FOREIGN PATENT DOCUMENTS

CN 106252848 B * 1/2020 ............... H01Q 1/36
JP 2004088198 A * 3/2004 ............... H01Q 1/32

(Continued)

OTHER PUBLICATIONS

Al-Nuaimi, M. et al., "Performance Investigation of a Dual Element IFA Array at 3 GHz for MIMO Terminals," 2011 Loughborough Antennas and Propagation Conference, Nov. 14-15, 2011, Loughborough, UK, 5 pages.

(Continued)

*Primary Examiner* — Hai V Tran
(74) *Attorney, Agent, or Firm* — Slater Matsil, LLP

(57) ABSTRACT

An antenna arrangement—comprising a differential mode antenna—and a common mode antenna, the antenna arrangement—comprising an antenna structure comprising one radiating element, at least one differential antenna feed configured to induce differential mode currents in the radiating element, and at least one common antenna feed configured to induce common mode currents in the radiating element. The antenna structure is configured to excite a first radiofrequency range and a second radiofrequency range in response to the differential mode currents and the common mode currents. The first antenna element and the second antenna element are configured to excite a third radiofrequency range in response to the differential mode currents or the common mode currents. This arrangement makes it possible to locate two antennas in the same given volume while maintaining a high level of isolation between the antennas.

18 Claims, 3 Drawing Sheets

(51) Int. Cl.

| | |
|---|---|
| ***H01Q 5/371*** | (2015.01) |
| ***H01Q 5/40*** | (2015.01) |
| ***H01Q 9/28*** | (2006.01) |
| ***H01Q 9/40*** | (2006.01) |

(56) References Cited

U.S. PATENT DOCUMENTS

| | | | | |
|---|---|---|---|---|
| 7,911,405 | B2 | 3/2011 | Pascolini et al. | |
| 8,059,046 | B2 | 11/2011 | Nysen | |
| 8,072,388 | B2 * | 12/2011 | Nysen | H01Q 5/40 343/810 |
| 8,633,860 | B2 | 1/2014 | Montgomery et al. | |
| 2002/0019247 | A1 * | 2/2002 | Egorov | H01Q 5/371 455/557 |
| 2002/0033774 | A1 * | 3/2002 | Ha | H01Q 1/38 343/702 |
| 2002/0149527 | A1 * | 10/2002 | Wen | H01Q 21/28 343/702 |
| 2003/0189519 | A1 * | 10/2003 | Rutfors | H01Q 9/265 343/702 |
| 2004/0106428 | A1 * | 6/2004 | Shoji | H01Q 9/0421 455/575.7 |
| 2007/0024513 | A1 * | 2/2007 | Sako | H01Q 21/28 343/730 |
| 2007/0152881 | A1 * | 7/2007 | Chan | H01Q 5/35 343/702 |
| 2009/0115670 | A1 * | 5/2009 | Nysen | H01Q 5/364 343/702 |
| 2009/0207092 | A1 * | 8/2009 | Nysen | H01Q 21/28 343/893 |
| 2009/0237319 | A1 * | 9/2009 | Fukushima | H01Q 9/24 343/793 |
| 2010/0283684 | A1 * | 11/2010 | Rabinovich | H01Q 5/371 343/700 MS |
| 2011/0287731 | A1 * | 11/2011 | Hase | H01Q 9/30 343/727 |
| 2013/0076579 | A1 * | 3/2013 | Zhang | H01Q 1/521 343/834 |
| 2014/0078010 | A1 * | 3/2014 | Li | H01Q 1/521 343/729 |
| 2014/0111399 | A1 * | 4/2014 | Lin | H01Q 1/36 343/843 |
| 2016/0336649 | A1 * | 11/2016 | Yu | H01Q 1/38 |
| 2017/0048649 | A1 | 2/2017 | Olgun et al. | |
| 2017/0149136 | A1 * | 5/2017 | Quinlan | H01Q 1/243 |
| 2017/0256843 | A1 * | 9/2017 | Hu | H01Q 21/28 |
| 2017/0256854 | A1 * | 9/2017 | Hu | H01Q 9/40 |
| 2018/0076505 | A1 * | 3/2018 | Hu | H01Q 21/28 |
| 2020/0058984 | A1 * | 2/2020 | Qiu | H01Q 7/00 |
| 2021/0184357 | A1 * | 6/2021 | Xu | H01Q 9/20 |

FOREIGN PATENT DOCUMENTS

| | | | | |
|---|---|---|---|---|
| JP | 4088388 | B2 * | 5/2008 | H01Q 5/321 |
| JP | 5389088 | B2 * | 1/2014 | H01Q 1/52 |
| WO | 2020173540 | A1 | 9/2020 | |

OTHER PUBLICATIONS

Diallo, A. et al., "Study and Reduction of the Mutual Coupling Between Two Mobile Phone PIFAs Operating in the DCS1800 and UMTS Bands," IEEE Transactions on Antennas and Propagation, vol. 54, No. 11, Nov. 2006, 12 pages.

Ilvonen, J., "Multiband and environment insensitive handset antennas," Aalto University, School of Electrical Engineering, Department of Radio Science and Engineering, Aalto University publication series: Doctoral Dissertations 184/2014, Dec. 5, 2014, 101 pages.

Xu, H. et al., "A Highly Integrated MIMO Antenna Unit: Differential/Common Mode Design," IEEE Transactions on Antennas and Propagation, vol. 67, No. 11, Nov. 2019, 11 pages.

* cited by examiner

DUAL MODE ANTENNA ARRANGEMENT

CROSS-REFERENCE TO RELATED APPLICATIONS

This application is a National Stage of International Application No. PCT/EP2020/059769, filed on Apr. 6, 2020, which is hereby incorporated by reference in its entirety.

TECHNICAL FIELD

The disclosure relates to an antenna arrangement comprising a differential mode antenna and a common mode antenna, and an electronic device comprising such an antenna arrangement.

BACKGROUND

Electronic devices such as mobile communication devices (e.g. smartphones) need to support more and more different radio signal technologies such as 2G/3G/4G radio. For example, 5G radio technology requires the frequency range to be expanded from sub-6 GHz to so called millimeter-wave (mmWave) frequencies, e.g. above 20 GHz.

Conventionally, antennas of such electronic devices are arranged next to but apart from the display, such that the display does not interfere with beam coverage. However, the development of using very large displays, covering as much as possible of the electronic device, makes the space available for the antennas very limited, forcing either a large part of the display to be inactive, or the size of the antennas to be significantly reduced, leading to reduced antenna performance. Furthermore, antennas which are packed closely in a shared space easily become inefficient and coupled to each other, thereby significantly lowering the antenna performance such as reduced achievable data rate and coverage.

The volume needed for antennas can be reduced by placing two well-isolated antennas in close proximity to each other. One way of achieving this is to use inverted F antennas (IFA) and to locate the antennas such that their ground points face each other. However, the total volume occupied by such a pair of antennas is more than twice the size of a single IFA, and in order to achieve a good level of isolation between the antennas they should be placed as far away from each other as possible. A further way of achieving good isolation, with close spacing between antennas, is to introduce decoupling structures between the antenna such as neutralization lines or decoupling networks. One drawback of such a solution is that it leads to narrow operation bandwidth and an overall antenna volume which, still, is not smaller than twice the size of a single IFA.

SUMMARY

It is an object to provide an improved antenna arrangement. The foregoing and other objects are achieved by the features of the independent claims. Further implementation forms are apparent from the dependent claims, the description, and the figures.

According to a first aspect, there is provided an antenna arrangement comprising a differential mode antenna and a common mode antenna, the antenna structure comprising one radiating element, at least one differential antenna feed configured to induce differential mode currents in the radiating element, and at least one common antenna feed configured to induce common mode currents in the radiating element, wherein the antenna structure is configured to excite a first radiofrequency range and a second radiofrequency range in response to the differential mode currents and the common mode currents, at least one first antenna element operably coupled to the differential antenna feed, such that said differential mode antenna is formed, and at least one second antenna element operably coupled to the common antenna feed, such that the common mode antenna is formed the first antenna element and the second antenna element being configured to excite a third radiofrequency range in response to the differential mode currents and/or the common mode currents.

This arrangement makes it possible to locate two antennas in the same given volume, and achieve improved efficiency as well as improved isolation compared to prior art solutions such as IFA. This self-decoupled solutions has the advantage that no extra space is needed for any decoupling structure, allowing the volume of the antenna arrangement to be more compact than a corresponding arrangement with decoupling structures. Furthermore, the arrangement works not only in a first radiofrequency range and a second radiofrequency range, such as the 5G NR bands n77 and n79, but also in a third radiofrequency range, such as the WLAN5 band, which significantly extends the operation bandwidth of the antenna arrangement.

In a possible implementation form of the first aspect, the third radiofrequency range is different from the first radiofrequency range and the second radiofrequency range.

In a further possible implementation form of the first aspect, the first antenna element excites the third radiofrequency range in response to one of the differential mode current and the common mode current, and the second antenna element excites the third radiofrequency range in response to one of the differential mode current and the common mode current. This allows the third radiofrequency range to be excited by differential mode currents, common mode currents, or a combination thereof.

In a further possible implementation form of the first aspect, the differential antenna feed is isolated from the common antenna feed by means of specific amplitude and phase relations of further currents induced at the common antenna feed by the differential mode currents, and specific amplitude and phase relations of further currents induced at the differential antenna feed by the common mode currents, the further currents minimizing the mutual coupling arising between the differential antenna feed and the common antenna feed, hence improving the efficiency of the antennas within the arrangement.

In a further possible implementation form of the first aspect, the further currents induced adjacent the common antenna feed have 180° phase difference and equal amplitude, such that $I1'=-I2'$, and the further currents induced adjacent the differential antenna feed have 180° phase difference and equal amplitude, such that $I3'=-I4'$. This allows the two differential mode currents to cancel each other out, facilitating easy and spatially efficient isolation between the differential antenna feed and the common antenna feed.

In a further possible implementation form of the first aspect, the first antenna element and the second antenna element share a center line, allowing the further currents to cancel each other out fully.

In a further possible implementation form of the first aspect, the first antenna element extends orthogonally to the second antenna element, such that the first antenna element is isolated from the second antenna element, allowing the antenna elements to be placed close together while still maintaining high efficiency.

In a further possible implementation form of the first aspect, the first antenna element and the second antenna element each comprises at least one radiator, the radiator being an open-ended slot, formed in the radiating element, or a monopole strip, extending from the radiating element. This allows the radiators to extend in one component and/or in one plane, such that the radiators take up as little volume as possible.

In a further possible implementation form of the first aspect, the first antenna element comprises one radiator extending along a first axis, and the second antenna element comprises at least one radiator extending along a second axis perpendicular to the first axis, or wherein the second antenna element comprises one radiator extending along a first axis, and the first antenna element comprises at least one radiator extending along a second axis perpendicular to the first axis. Such a radiator arrangement allows the radiators to be placed as close as possible to each other, while still maintaining good isolation between antennas.

In a further possible implementation form of the first aspect, the first antenna element comprises one radiator extending along a first axis, and the second antenna element comprises two radiators extending along a second axis perpendicular to the first axis, the two radiators of the second antenna element being arranged symmetrically on opposite sides of the one radiator of the first antenna element.

In a further possible implementation form of the first aspect, the second antenna element comprises one radiator extending along a first axis, and the first antenna element comprises two radiators extending along a second axis perpendicular to the first axis, the two radiators of the first antenna element being arranged symmetrically on opposite sides of the one radiator of the second antenna element.

In a further possible implementation form of the first aspect, the differential antenna feed comprises at least two radiator contacts, and the common antenna feed comprises one radiator contact, the radiator contacts being arranged in one common plane parallel with a main plane of the radiating element.

In a further possible implementation form of the first aspect, the antenna arrangement further comprises at least one ground connection comprising one radiator contact arranged in the common plane.

In a further possible implementation form of the first aspect, the differential antenna feed, the common antenna feed, and optionally the ground connection are coupled to the radiating element by means of a galvanic coupling or a capacitive coupling.

In a further possible implementation form of the first aspect, the radiating element comprises conductive paint or a layer of flexible, conductive sheet material.

According to a second aspect, there is provided an electronic device comprising a first dielectric substrate, a second dielectric substrate, at least one printed circuit board, and at least one antenna arrangement according to the above, the radiating element of the antenna arrangement being arranged on a surface of the first dielectric substrate facing the second dielectric substrate, the differential antenna feed and the common antenna feed of the antenna arrangement being partially arranged on a surface of the second dielectric substrate facing the first dielectric substrate.

This arrangement makes it possible to locate two antennas in the same given volume, such that the small space available within the electronic device may be used by other components. Furthermore, the arrangement works not only in a first radiofrequency range and a second radiofrequency range, such as the 5G NR bands n77 and n79, but also in a third radiofrequency range, such as the WLAN5 band, which significantly extends the operation bandwidth of the antenna arrangement and improves the overall function of the electronic device.

In a possible implementation form of the second aspect, the differential antenna feed and the common antenna feed and, optionally, the ground connection of the antenna arrangement extend through the second dielectric substrate to the printed circuit board.

In a further possible implementation form of the second aspect, the first dielectric substrate is an outer glass cover, and the second dielectric substrate is an inner plastic substrate.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION OF ILLUSTRATIVE EMBODIMENTS

Figure 1:
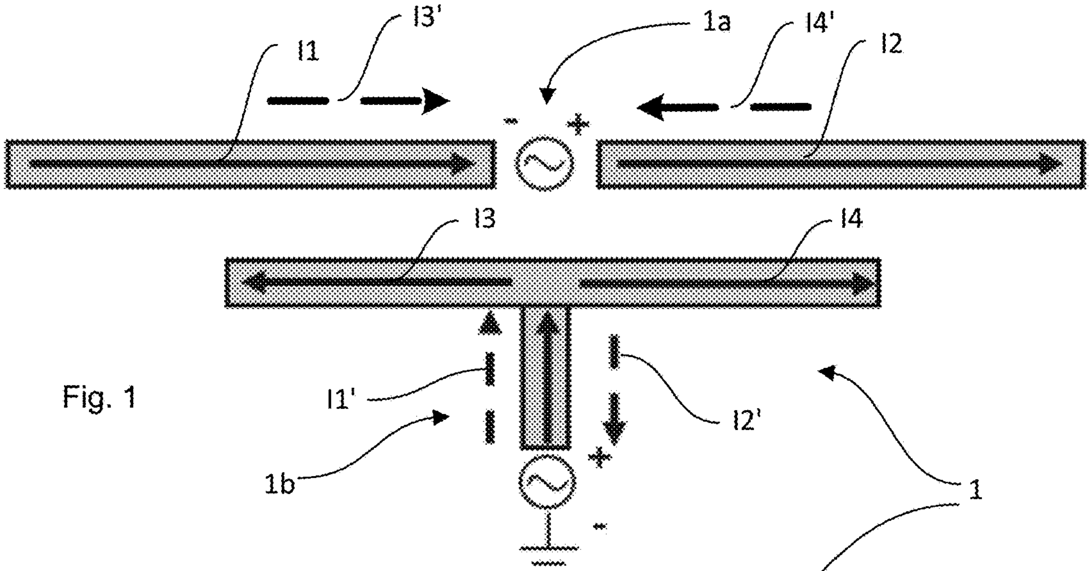
FIG. 1 is a schematic illustration of an antenna structure in accordance with an embodiment of the present invention.

FIG. 1 shows a schematic illustration of an antenna arrangement 1 comprising a differential mode antenna 1*a* and a common mode antenna 1*b*, the differential mode antenna 1*a* and the common mode antenna 1*b* being arranged in a single, common volume within an electronic device 9. The differential mode antenna 1*a* may for example be a vertical high frequency antenna (V-HF) or a horizontal high frequency antenna (H-HF). Correspondingly, the common mode antenna 1*b* may for example be a vertical high frequency antenna (V-HF) or a horizontal high frequency antenna (H-HF).

The antenna arrangement 1 comprises an antenna structure 2, which comprises one radiating element 3, at least one differential antenna feed 4 configured to induce differential mode currents I1, I2 in the radiating element 3, and at least one common antenna feed 5 configured to induce common mode currents I3, I4 in the radiating element 3. The differential mode antenna is and the common mode antenna 1*b* may share one radiating element 3, or may have one radiating element 3 each. A differential mode antenna is has anti-symmetrical feed and electrical current distribution, while a common mode antenna 1*b* has symmetrical feed and electrical current distribution.

The radiating element 3 is a conductive element, and may be a floating element such as a surface radiator. The radiating element 3 may comprise of conductive paint or be a layer of flexible, conductive sheet material.

Differential mode currents I1, I2 induce further currents I1', I2' at the common antenna feed 5, as shown in FIG. 1. Differential mode current I1 induces differential mode current I1' at the common antenna feed 5, and differential mode current I2 induces differential mode current I2' at the common antenna feed 5. Correspondingly, common mode currents I3, I4 induce further currents I3', I4' at the differential antenna feed 4. Common mode current I3 induces further current I3' at the differential antenna feed 4, and differential mode current I4 induces further current I4' at the differential antenna feed 4. The further currents I1', I2', I3', I4' are undesirable and should be compensated for as much as possible.

The mutual coupling which arises between the differential antenna feed 4 and the common antenna feed 5 can be minimized due to the specific properties of the differential mode current distribution, i.e. differential mode currents I1, I2, and the common mode current distribution, i.e. common mode currents I3, I4. These specific properties include amplitude and phase relations of the currents. The further currents I1', I2', induced at the common antenna feed 5 by differential mode currents I1, I2, cancel each other out by means of said specific amplitude and phase relations. This is the main mechanism behind how an excellent level of isolation between differential antenna feed 4 and the common antenna feed 5 is achieved. The same principle is valid for further currents I3', I4', induced by the common mode currents I3, I4 in the differential antenna feed 4. By isolating the differential antenna feed 4 from the common antenna feed 5, the efficiency of the differential mode antenna 1*a* and a common mode antenna 1*b* is improved.

In one embodiment, the further currents I1', I2' induced adjacent the common antenna feed 5 have 180° phase difference and equal amplitude, such that I1'=−I2'. Correspondingly, the currents I3', I4' induced adjacent the differential antenna feed 4 have 180° phase difference and equal amplitude, such that I3'=−I4'. This is shown in FIG. 1. Since each pair of further currents I1' and I2', I3' and I4' are close and counterphase, the radiation of each current, in each pair, cancel each other out, wherefore maximally efficient isolation is provided between the differential antenna feed 4 and the common antenna feed 5. Different phase differences and amplitudes are also conceivable, as long as the further currents I1' and I2', and/or I3' and I4', cancel each other out to a substantial degree The coupling cancellation of counterphase currents and the different distributions of the radiation currents results in a differential mode/common mode antenna arrangement having high isolation and complementary patterns even if the radiating elements 3 of the differential mode antenna 1*a* and the common mode antenna 1*b* are overlapped, or if only one radiating element 3 is used for both antennas. This facilitates good MIMO performance in a very compact volume.

The antenna arrangement 1 further comprises at least one first antenna element 6 which is operably coupled to the differential antenna feed 4, and at least one second antenna element 7 operably coupled to the common antenna feed 5. The first antenna element 6 and the differential antenna feed 4 together form the differential mode antenna 1*a*, and the second antenna element 7 and the common antenna feed 5 together form the common mode antenna 1*b*.

The antenna structure 2, in particular radiating element 3, differential antenna feed 4, and common antenna feed 5, is configured to excite a first radiofrequency range and a second radiofrequency range in response to differential mode currents I1, I2 and common mode currents I3, I4. The radiating element 3, differential antenna feed 4, and common antenna feed 5 together have two resonances allowing excitation of the first radiofrequency range and the second radiofrequency range. The first radiofrequency range is completely, or partially, different from the second radiofrequency range. For example, the first radiofrequency range may be within the 5G NR band n77, and the second radiofrequency range may be within the 5G NR band n79.

The first antenna element 6 and the second antenna element 7 are configured to excite a third radiofrequency range in response to the differential mode currents I1, I2 and/or the common mode currents I3, I4. By adding the first antenna element 6 and the second antenna element 7, a third high frequency resonance appears for both the differential mode antenna is and the common mode antenna 1*b*. The third radiofrequency range complements the first radiofrequency range and the second radiofrequency range, and may be completely, or partially, different from the first radiofrequency range and the second radiofrequency range. For example, the third radiofrequency range may be within the WLAN5 band. The first antenna element 6 and the second antenna element 7 may also be configured to excite any number of additional radiofrequency ranges.

When comparing the present invention with a prior art solution comprising two inverted F antennas (IFA), not only is the total volume reduced by at least 50%, but the present invention has 2 dB better N79 and WLAN5 efficiencies, as well as over 6 dB improvement of the isolation level.

The first antenna element 6 excites the third radiofrequency range in response to one of the differential mode currents I1, I2 and the common mode currents I3, I4. Correspondingly, the second antenna element 7 excites the third radiofrequency range in response to one of the differential mode currents I1, I2 and the common mode currents I3, I4. The third radiofrequency range may, in other words, be excited by differential mode currents only, common mode currents only, or a combination of differential mode currents and common mode currents.

Figure 2A:
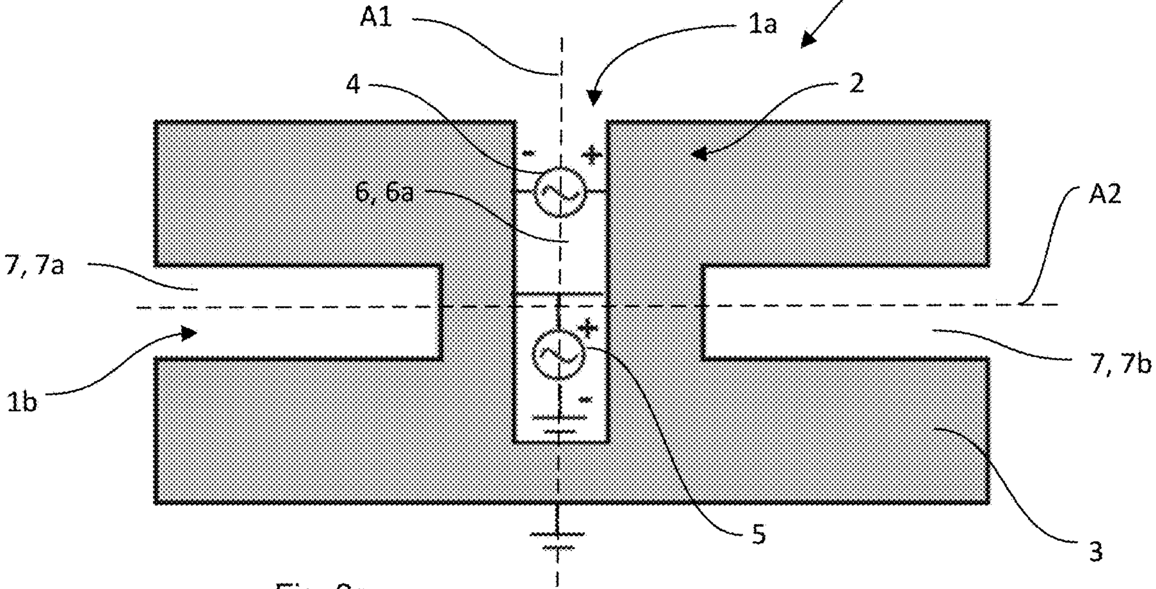
FIG. 2*a* is a schematic top view of an antenna structure in accordance with an embodiment of the present invention.
Figure 2B:
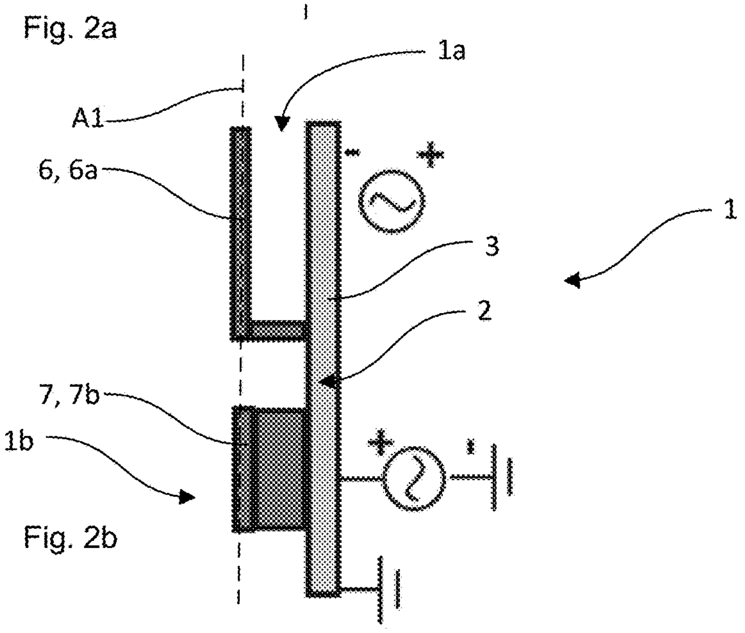
FIG. 2*b* is a schematic side view of the embodiment of FIG. 2*a;*
Figure 3A:
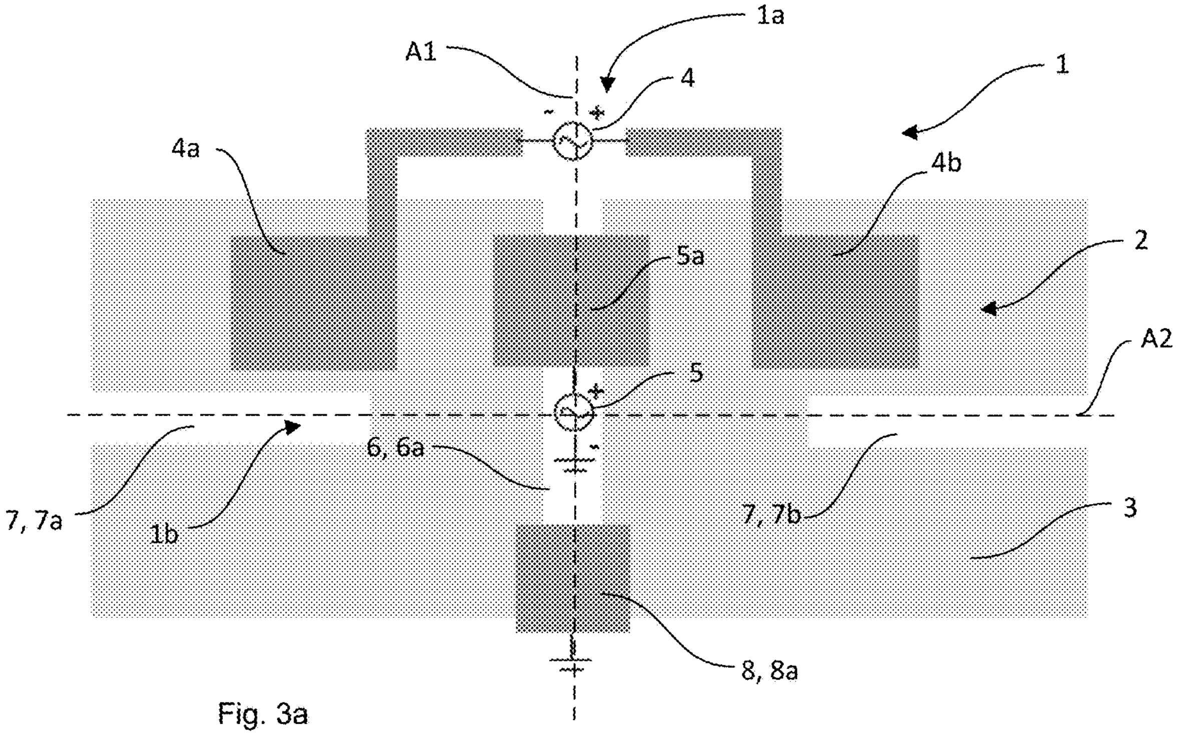
FIG. 3*a* is a top view of an antenna arrangement in accordance with an embodiment of the present invention.
Figure 4A:
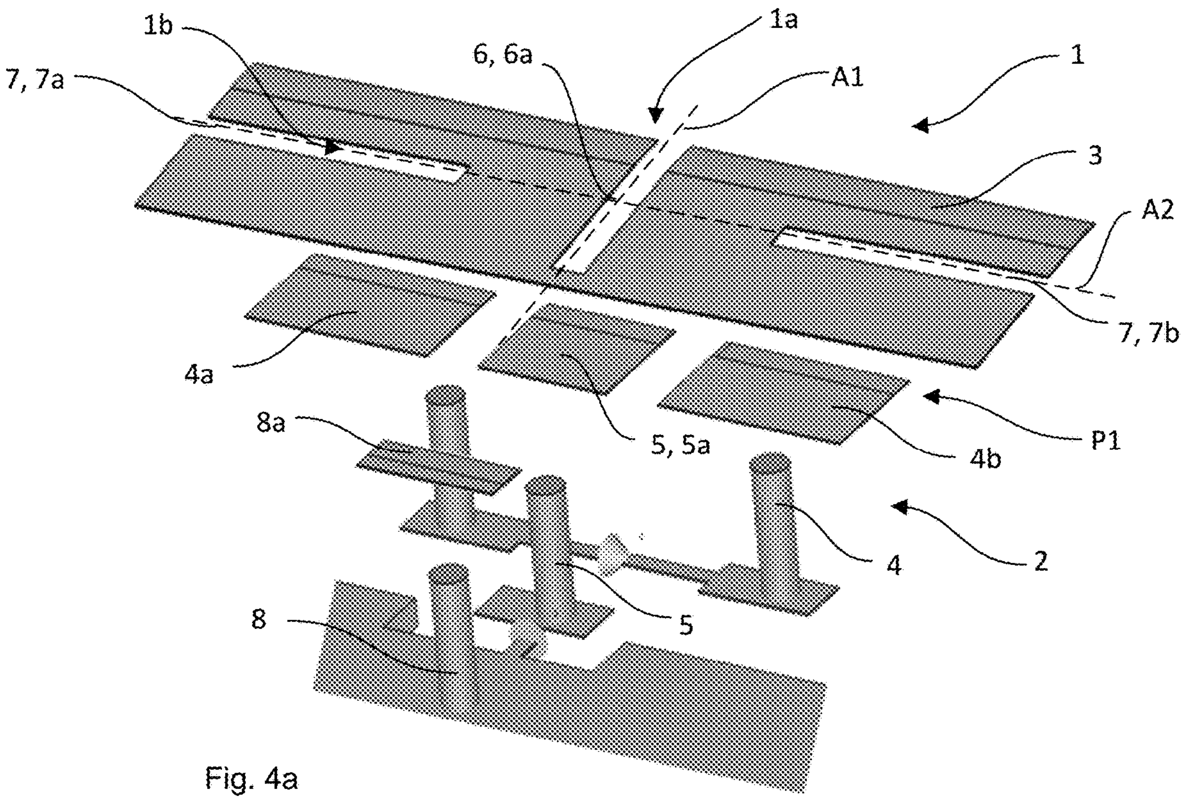
FIG. 4*a* is an exploded view of an antenna arrangement in accordance with an embodiment of the present invention.

The first antenna element 6 and the second antenna element 7 are preferably arranged such that they share a center line, i.e. such that share a center and extend symmetrically from the center line, as shown in FIGS. 2*b*, 3*a*, and 4*a*. By such a symmetrically arrangement, the further currents I1' and I2', I3' and I4', respectively, can cancel each other out fully.

The first antenna element 6 may extend orthogonally to the second antenna element 7. This isolates the first antenna element 6 from the second antenna element 7. By placing the antenna elements 6,7 orthogonally, the antenna elements can be placed close together while still maintaining high isolation and thus efficiency.

The first antenna element 6 and the second antenna element 7 each comprise at least one radiator. The radiators may be quarter-wavelength open-ended slots formed in the radiating element 3, as shown in FIGS. 2*a*, 3*a*, and 4*a*. At least one of the radiators may also be a monopole strip extending from the radiating element 3, as shown in FIG. 2*b*.

The first antenna element 6 may comprise one radiator 6*a* extending along a first axis A1, and the second antenna element 7 may comprise at least one radiator 7*a*, 7*b* extending along a second axis A2 perpendicular to the first axis A1, as shown in FIGS. 11 to 3*a* and 4*a*. Correspondingly, the second antenna element 7 may comprise one radiator 7*a* extending along a first axis A1, and the first antenna element 6 may comprise at least one radiator 6*a*, 6*b* extending along a second axis A2 perpendicular to the first axis A1 (not shown).

The first antenna element 6 may comprise one radiator 6*a* extending along a first axis A1, and the second antenna element 7 may comprise two radiators 7*a*, 7*b* extending along a second axis A2 perpendicular to the first axis A1. The two radiators 7*a*, 7*b* of the second antenna element 7 are arranged symmetrically on opposite sides of the one radiator 6*a* of the first antenna element 6, as shown in FIGS. 2*a*, 3*a*, and 4*a*.

Correspondingly, the second antenna element 7 may comprise one radiator 7*a* extending along a first axis A1, and the first antenna element 6 comprises two radiators 6*a*, 6*b* extending along a second axis A2 perpendicular to the first axis A1. The two radiators 6*a*, 6*b* of the first antenna element 6 are arranged symmetrically on opposite sides of the one radiator 7*a* of the second antenna element 7 (not shown).

Figure 3B:
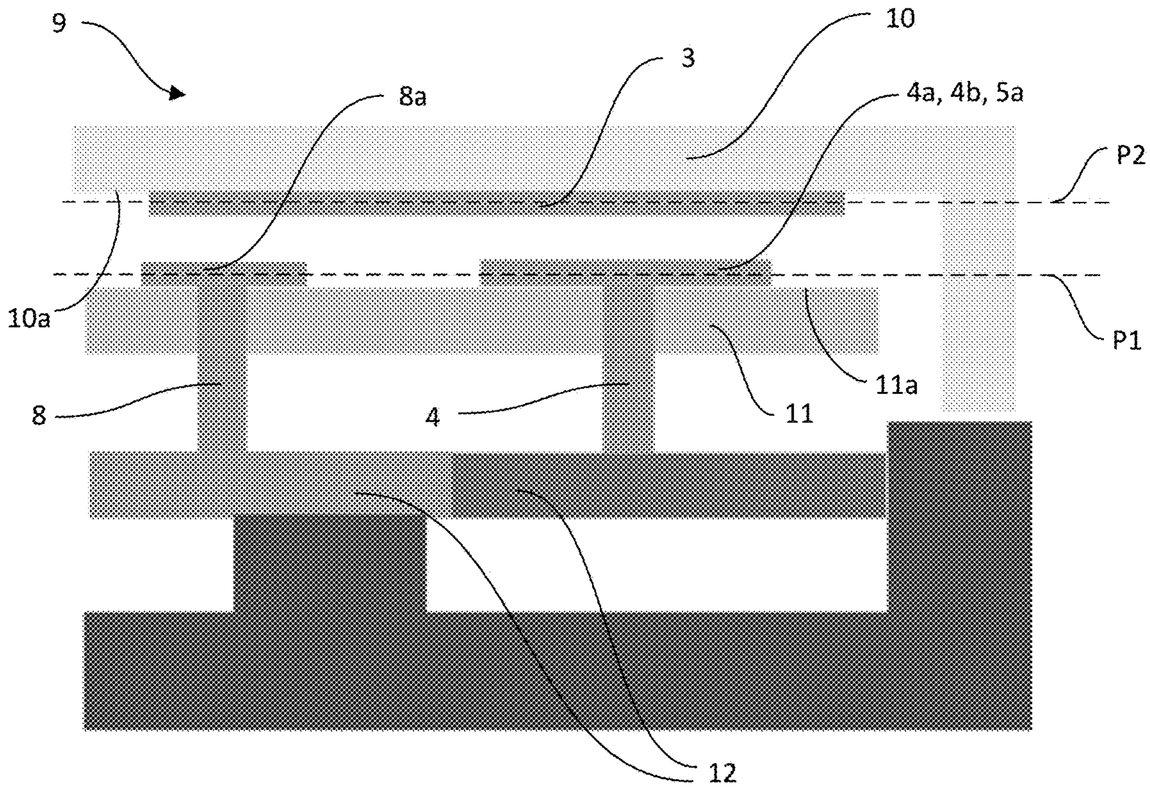
FIG. 3*b* is a cross-sectional side view of the embodiment of FIG. 3*a*, arranged within an electronic device.

The differential antenna feed 4 may comprise at least two radiator contacts 4*a*, 4*b*, and the common antenna feed 5 may comprise one radiator contact 5*a*. The radiator contacts 4*a*, 4*b*, 5*a* are arranged in one common plane P1 parallel with a main plane P2 of the radiating element 3, as shown in FIG. 3*b*. The antenna arrangement 1 may further comprise at least one ground connection 8 comprising one radiator contact 8*a* also arranged in the common plane P1. The radiator contacts 4*a*, 4*b*, 5*a*, 8*a* may be floating radiator pads. The radiator contacts 4*a*, 4*b*, 5*a*, 8*a*, as well as antenna feeds 4, 5, ground connection 8, and the radiating element 3 are shown in detail in FIG. 4*a*.

One or several of the differential antenna feed 4, the common antenna feed 5, and the ground connection 8 may be coupled to the radiating element 3 by means of a galvanic coupling or a capacitive coupling.

Figure 4B:
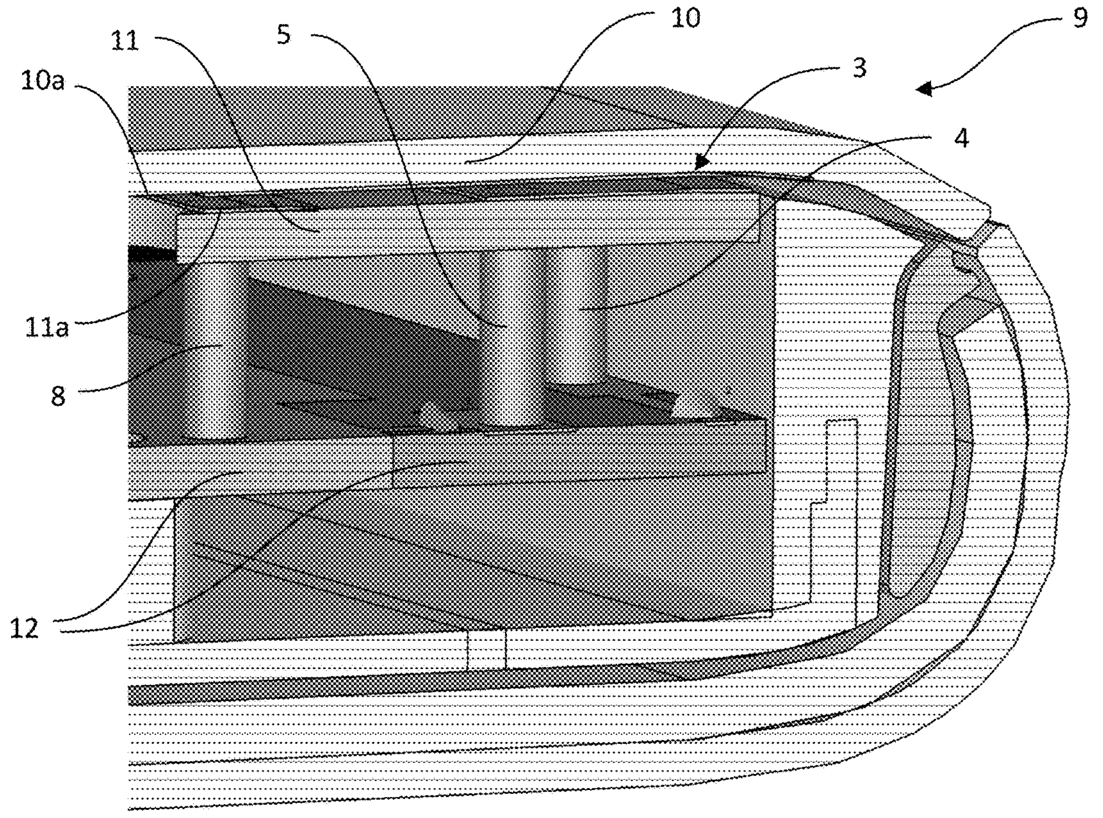
FIG. 4*b* is a perspective view of the embodiment of FIG. 4*a*, arranged within an electronic device.

The present invention also relates to an electronic device 9 as shown in FIG. 4*b*, the electronic device 9 comprising a first dielectric substrate 10 and a second dielectric substrate 11 arranged at least partially in substantially parallel. The first dielectric substrate 10 and the second dielectric substrate 11 may be separated by a small distance in a direction perpendicular to planes P1, P2, as shown in FIGS. 3*b* and 4*b*, or may be arranged such that they are in direct contact with each other (not shown). The first dielectric substrate 10 may be an outer glass cover, and the second dielectric substrate 11 may be an inner plastic substrate. The electronic device 9 may further comprise a display panel, supported by a frame and covered by an additional outer glass cover, as indicated at the bottom of FIG. 4*b*.

The electronic device 9 furthermore comprises at least one printed circuit board 12 (PCB), arranged between the second dielectric substrate 11 and a frame of the electronic device 9, as shown in FIG. 4*b*. The printed circuit board 12 may be a copper PCB or FR4 PCB. The frame may be made of any suitable material such as aluminium or glass. As mentioned above, the frame may be used to support the display panel of the electronic device 9.

The electronic device 9 furthermore comprises at least one of the above described antenna arrangement 1. The radiating element 3 of the antenna arrangement 1 is arranged on surface boa of the first dielectric substrate 10, i.e. the surface boa which faces the second dielectric substrate 11. The differential antenna feed 4 and the common antenna feed 5 of the antenna arrangement 1 may be partially arranged on surface 11*a* of the second dielectric substrate 11, i.e. the surface 11*a* which faces the first dielectric substrate 10.

One or several of the differential antenna feed 4, the common antenna feed 5, the ground connection 8 may extend through the second dielectric substrate 11 to the printed circuit board 12, as shown in FIG. 4*b*.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. An antenna arrangement comprising a differential mode antenna and a common mode antenna, said antenna arrangement comprising:

an antenna structure comprising one radiating element including at least one differential antenna feed configured to induce first differential mode currents in said radiating element and at least one common antenna feed configured to induce first common mode currents in said radiating element, wherein the radiating element comprises conductive paint or a layer of flexible and conductive sheet material;

wherein the antenna structure is configured to excite a first radiofrequency range and a second radiofrequency range in response to said first differential mode currents and said first common mode currents, at least one first antenna element operably coupled to said differential antenna feed such that said differential mode antenna is formed, and at least one second antenna element operably coupled to said common antenna feed such that said common mode antenna is formed, wherein said at least one first antenna element and said second antenna element are configured to excite a third radiofrequency range in response to said first differential mode currents or said first common mode currents.

2. The antenna arrangement according to claim 1, wherein said at least one first antenna element excites said third radiofrequency range in response to one of said first differential mode current and said first common mode current, and wherein said second antenna element excites said third radiofrequency range in response to one of said first differential mode current and said first common mode current.

3. The antenna arrangement according to claim 1, wherein said differential antenna feed is isolated from said common antenna feed by a first amplitude and first phase relations of second differential mode currents induced at said common antenna feed by said first differential mode currents, and a second amplitude and second phase relations of second common mode currents induced at said differential antenna feed by said first common mode currents, wherein said second differential mode currents and second common mode currents minimize a mutual coupling arising between said differential antenna feed and said common antenna feed.

4. The antenna arrangement according to claim 3, wherein said second differential mode currents induced at said common antenna feed have 180° phase difference and equal amplitude, and wherein said second common mode currents induced at said differential antenna feed have 180° phase difference and equal amplitude.

5. The antenna arrangement according to claim 1, wherein said first antenna element extends orthogonally to said second antenna element, such that said first antenna element is isolated from said second antenna element.

6. The antenna arrangement according to claim 1, wherein said first antenna element and said second antenna element each comprises at least one radiator, wherein said radiator is an open-ended slot formed in said radiating element, or wherein said radiator is a monopole strip extending from said radiating element.

7. The antenna arrangement according to claim 6, wherein said first antenna element comprises one radiator extending along a first axis, and wherein said second antenna element comprises at least one radiator extending along a second axis perpendicular to said first axis; or wherein said second antenna element comprises one radiator extending along a first axis, and wherein said first antenna element comprises at least one radiator extending along a second axis perpendicular to said first axis.

8. The antenna arrangement according to claim 6, wherein said first antenna element comprises one radiator extending along a first axis, and wherein said second antenna element comprises two radiators extending along a second axis perpendicular to said first axis; and wherein said two radiators of said second antenna element are arranged symmetrically on opposite sides of said one radiator of said first antenna element.

9. The antenna arrangement according to claim 6, wherein said second antenna element comprises one radiator extending along a first axis, wherein said first antenna element comprises two radiators extending along a second axis perpendicular to said first axis; and wherein said two radiators of said first antenna element are arranged symmetrically on opposite sides of said one radiator of said second antenna element.

10. The antenna arrangement according to claim 1, wherein said differential antenna feed comprises at least two radiator contacts, wherein said common antenna feed comprises one radiator contact, and wherein said radiator contacts are arranged in one common plane parallel with a main plane of said radiating element.

11. The antenna arrangement according to claim 10, further comprising at least one ground connection comprising one radiator contact arranged in said common plane.

12. The antenna arrangement according to claim 11, wherein said differential antenna feed and said common antenna feed are coupled to said radiating element by means of a galvanic coupling or a capacitive coupling.

13. The antenna arrangement according to claim 12, wherein said at least one ground connection is coupled to said radiating element by means of the galvanic coupling or the capacitive coupling.

14. An electronic device comprising:

a first dielectric substrate;

a second dielectric substrate;

at least one printed circuit board; and at least one antenna arrangement comprising a differential mode antenna and a common mode antenna, the antenna arrangement comprising;

an antenna structure comprising one radiating element including at least one differential antenna feed configured to induce first differential mode currents in said radiating element and at least one common antenna feed configured to induce first common mode currents in said radiating element, wherein the radiating element comprises conductive paint or a layer of flexible and conductive sheet material, and wherein the antenna structure is configured to excite a first radiofrequency range and a second radiofrequency range in response to said first differential mode currents and said first common mode currents, at least one first antenna element operably coupled to said differential antenna feed such that said differential mode antenna is formed, and at least one second antenna element operably coupled to said common antenna feed such that said common mode antenna is formed, wherein said first antenna element and said second antenna element are configured to excite a third radiofrequency range in response to said first differential mode currents or said first common mode currents;

wherein the radiating element of said antenna arrangement is arranged on a surface of said first dielectric substrate facing said second dielectric substrate; and wherein the differential antenna feed and the common antenna feed of said antenna arrangement are partially arranged on a surface of said second dielectric substrate facing said first dielectric substrate.

15. The electronic device according to claim 14, wherein said differential antenna feed and said common antenna feed extend through said second dielectric substrate to said printed circuit board.

16. The electronic device according to claim 14, wherein said first dielectric substrate is an outer glass cover, and said second dielectric substrate is an inner plastic substrate.

17. The electronic device according to claim 14, further comprising at least one ground connection comprising one radiator contact arranged in a common plane.

18. The electronic device according to claim 17, wherein the at least one ground connection of said antenna arrangement extends through said second dielectric substrate to said printed circuit board.

* * * * *